Dec. 4, 1962   R. W. VOIGT   3,066,829
DOUBLE KEY FOR DISPENSING MATERIALS FROM COLLAPSIBLE TUBES
Filed Oct. 23, 1959   2 Sheets-Sheet 1
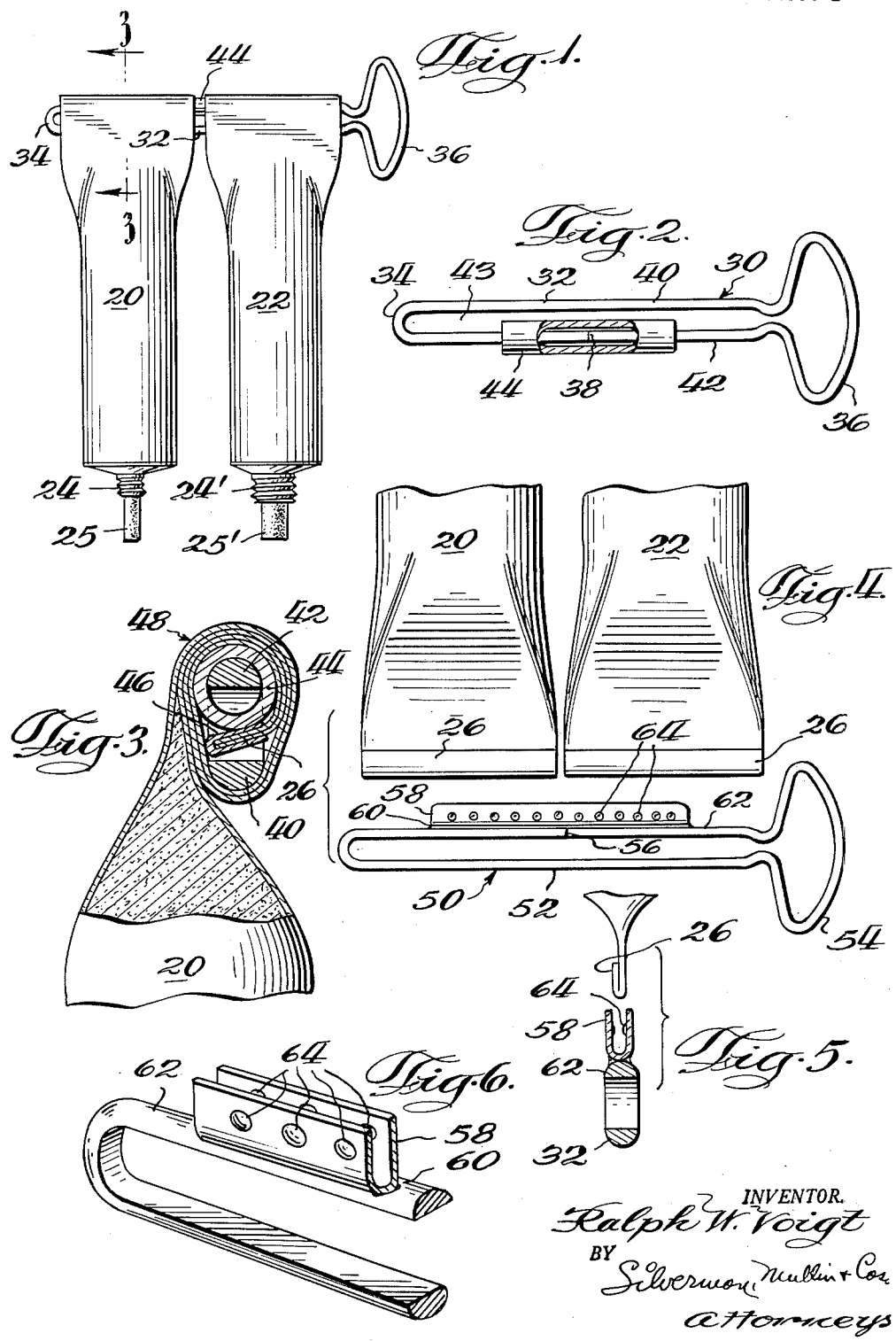
INVENTOR.
Ralph W. Voigt
BY Silverman, Mullin & Cox
attorneys Dec. 4, 1962 R. W. VOIGT 3,066,829
DOUBLE KEY FOR DISPENSING MATERIALS FROM COLLAPSIBLE TUBES
Filed Oct. 23, 1959 2 Sheets-Sheet 2
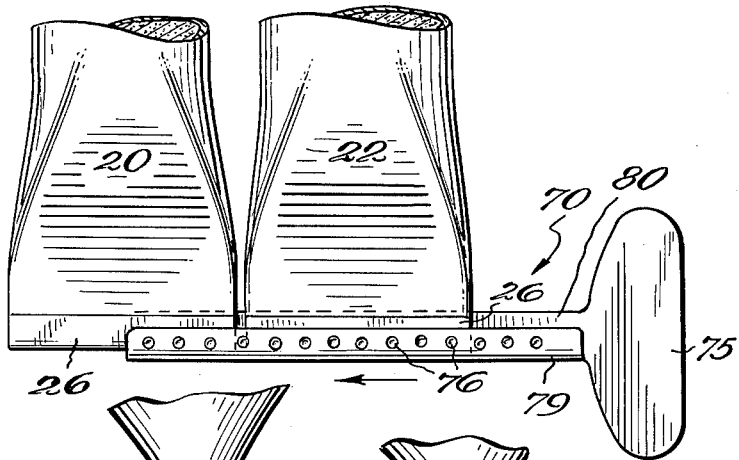
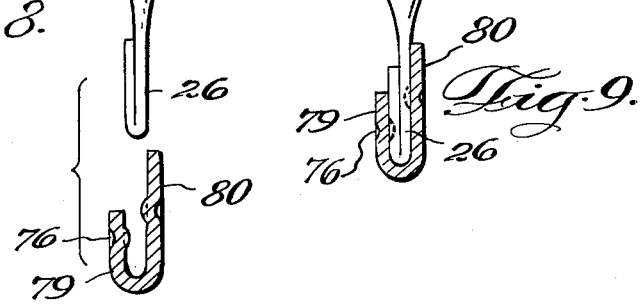
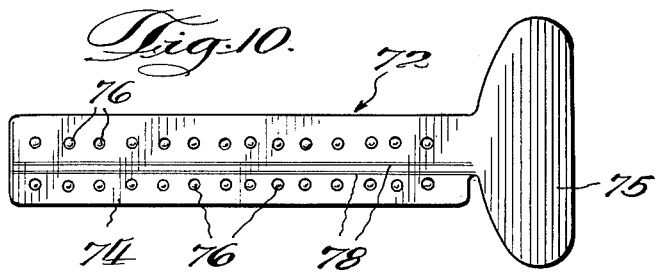
INVENTOR.
Ralph W. Voigt
BY Silverman, Mullin & Cox
Attorneys United States Patent Office 3,066,829
Patented Dec. 4, 1962

3,066,829
DOUBLE KEY FOR DISPENSING MATERIALS FROM COLLAPSIBLE TUBES
Ralph W. Voigt, 5747 Waveland Ave., Chicago 34, Ill.
Filed Oct. 23, 1959, Ser. No. 848,468
4 Claims. (Cl. 222—94)

This invention relates generally to key means for extruding the contents of collapsible tubes and more particularly, relates to an improved construction for a slotted key member for extruding the contents of a plurality of collapsible tubes simultaneously and in desired portions.

Many practices are known which require mixture of two or more ingredients packaged separately in collapsible tubes, the ingredients being dispensed from the tubes in desired proportions for intermixture thereof immediately prior to their desired use. One such practice contemplates preparation of a synthetic resin especially suitable for use in repair of metal articles, for instance, an epoxy type resin, which can be rapidly cured by heat treatment after application of the mixture to the article and shaping and finishing thereof.

In preparing the mixture, the ingredients in the separate tubes are required to be extruded simultaneously and in desired proportions immediately prior to intended use of the mixture. After the contents of the tubes are depleted, the tubes are disposed of. Heretofore, the various key structures available for use with such collapsible tubes have been less than satisfactory in many important respects. Primarily, they have been relatively costly to manufacture considering the disposable nature thereof thereby adding an undesirable increment to the price of the product. Further, many of the prior key structures have been unduly bulky and cumbersome to install and use. Others have required special holders for the tubes during use of the key means.

Accordingly, it is a principal object of the invention to provide key means of the character described which is characterized by a construction capable of substantially eliminating the disadvantages hereinabove enumerated.

Another important object of the invention is to provide a double key structure for extruding the contents of a plurality of tubes which is highly economical to manufacture, yet which is very efficient and easy to use, and which is sturdy.

A further object of the invention is to provide a double key of the character described which includes a clip means for holding the collapsible tubes during rotation of the key structure and a slotted key member cooperable with said clip means to extrude the contents of the tube upon rotation of the key member.

Another object of the invention is to provide a modified embodiment of the invention in which the key structure has the said clip means rigidly attached thereto.

Another object of the invention is to provide a key structure which comprises a metal stamping adapted to be formed by conventional bending techniques into the advantageous key structure embodying the principles of the invention.

The foregoing and other objects of the invention will become apparent as the description thereof evolves. Preferred embodiments of the invention have been described in detail in the specification and illustrated in the accompanying drawings. Minor departures from the structural features described and illustrated are contemplated without departing from the scope or sacrificing any of the advantages of the invention.

In the drawings, wherein the same characters of reference are employed to identify the same or equivalent parts thereof throughout the several figures thereof:

FIG. 1 is a plan view showing one embodiment of the invention operatively connected with a pair of collapsible tubes.

FIG. 2 is a plan view of the embodiment of the invention of FIG. 1 with the tubes removed and portions in section to show details.

FIG. 3 is a fragmentary sectional view taken along the line 3—3 of FIG. 1 and in the general direction indicated.

FIG. 4 is a plan view of a modified form of the invention shown preparatory to installation on a pair of collapsible tubes, illustrated partially.

FIG. 5 is a fragmentary vertical sectional view taken medially through the modified form of the invention shown in FIG. 4.

FIG. 6 is a fragmentary perspective view of the key structure embodying said modified form of the invention.

FIG. 7 is a plan view of another modified form of the invention shown in the process of installation of a pair of tubes illustrated partially.

FIG. 8 is a vertical sectional view taken through the modified form of the invention of FIG. 7.

FIG. 9 is a sectional view taken through the said modified form attached to the tubes.

FIG. 10 is a top plan view of the blank from which the said modified form of FIG. 7 can be made.

Referring now to the drawings, the collapsible tubes of the type with which the invention is intended to be used are designated 20 and 22 respectively in FIG. 1. The collapsible tubes are of conventional construction such as for resins, pastes or the like, the tubes having threaded dispensing necks 24 and 24' at one end thereof adapted to be fitted with caps (not shown). Each tube has a flattened and usually folded over opposite end 26 adapted to be rolled or otherwise compressed to extrude the contents of the tube through the dispensing neck thereof.

Referring to FIG. 2, the slotted key member designated generally by the reference character 30 comprises one form of the invention. Same preferably is made from a single length of metal rod bent to shape to provide an elongate loop 32 closed at one end 34 thereof. The opposite end is enlarged to provide a convenient finger grip 36 for rotating the key member. The abutting free extremities of the metal rod are shown at 38. The elongate legs 40 and 42 of the loop 32 are straight and substantially parallel along their length to define a slot 43 with the abutting extremities 38 located intermediate the end 34 and grip 36. A sleeve 44 has the leg 42 extending therethrough, the sleeve being formed of suitable material such as plastic, paperboard or the like of sufficient strength and rigidity to prevent separation of the extremities 38 during rotation of the key member.

Referring to FIG. 3, a holding clip 46 is employed in cooperation with the key 30 for extruding the contents of tubes. The clip 46 preferably is formed of metal and has an elongate channel-shaped configuration suitable for being clinched to secure the flattened ends 26 of the tubes therein. As seen in FIG. 1, to extrude the contents 25 and 25' of the tubes 20 and 22 simultaneously, the flattened ends of the tubes arranged side-by-side are engaged in the clip 46 and the clip inserted in the slot 43. Clip 46 also functions to prevent opening of the flattened ends 26. As shown in FIG. 3, the sleeve 44, being of substantially larger diameter than the rod 42, provides, in addition to the reinforcement of joint 38, a substantial bearing surface for the clip 46. This prevents breakage of the tubes at the clip 46 and also more securely and reliably retains the clip 46 and tubes 20—22 in the slot 43. The key 30 is then rotated manually to roll the flattened ends 26 as shown in FIG. 3. The contents of tubes thereby are extruded simultaneously and in the desired proportions, which as illustrated, would be in equal amounts from each tube for the same diameter of tube irrespective of the size of the threaded necks 24 and 24'. During rotation of the key member, the extremities 38 are disposed on the interior of the sleeve so that their possible twisting or separation is prevented. A uniform and flattened wrap of the tubes on the key member is obtained, as seen at 48 in FIG. 3, which assures smooth and regular extrusion of the contents of both tubes simultaneously as the key member is rotated.

Referring to FIGS. 4-6, a modified form of the invention is designated generally by the reference character 50. The embodiment 50 enables elimination of the sleeve 44 employed in connection with the key member 30. The member 50 likewise has the key formation thereof formed from a single length of metal rod material to provide the elongate loop 52 corresponding to loop 32 and the handle portion 54 corresponding to handle 36. However, the abutting extremities 56 of the rod are held together by means of the clip member 58 which is secured, as by solder 60, to an outer surface of the leg 62 of the loop 52 over said extremities. The clip 58 may be identical to clip 46 and provided with a series of spaced indentations 64 in each outer wall thereof, so that the resulting inner protrusions can be pressed into the flattened ends 26 of the tubes after same is inserted in the clip 58. End 26 of a tube is shown poised for insertion into the clip 58 in FIG. 5.

Referring to FIGS. 7 through 10, another embodiment of the invention is designated generally by the reference character 70. Same is conveniently adapted to be formed from a flat, metal blank 72 (see FIG. 10) which may be stamped to shape at high speed using conventional metal stamping machinery. The blank 72 has an elongate, rectangular segment 74 and an enlarged end portion 75 which provides the handle for the key member. The segment 74 may be provided with a pair of parallel rows of spaced apart indentations 76 during the stamping procedure.

Referring to FIG. 8, after formation of the blank 72, the segment 74 is folded longitudinally such as, along broken lines 78 in FIG. 10 to provide a channel formation the legs 79 and 80 of which are of unequal width. After the flattened end 26 of a tube is inserted in the channel formation between legs 79 and 80, the legs are pressed together to tightly sandwich the flattened end 26 therebetween as seen in FIG. 9. The protrusions on the inner surfaces of the legs 79 and 80 resulting from the indentations 76 tightly engage the flattened end 26. As seen in FIG. 7, tubes 20 and 22 are being engaged with the key member 70 by sliding the flattened ends 26 thereof into the channel formation provided by legs 79 and 80. The greater width of the leg 80 provides for a satisfactory key bearing surface upon which the ends of the tubes can be wrapped to achieve the uniform wrap equivalent to the wrap 48 shown in FIG. 3. The channel also serves the function of the clip in the other embodiments to hold the tubes in proper spatial relation during extrusion.

The simple, sturdy and economical construction of the several embodiments of the invention enables the key structures to be installed directly on the tubes 20 and 22 and the entire assembly packaged as a convenient product ready for use. The purchaser thereafter merely removes the caps from the necks of the tubes and proceeds to rotate the key member to extrude the contents of the tubes. Thus the manufacturer of a particular tubed product can attach the invention directly to the tubes so that the purchaser does not have to install the invention in order to extrude the contents of the tubes. The manufacturer is induced to do this by reason of the economical cost of manufacture and installation of the invention. Further, the key structure remains in place on the tubes as all times and is discarded with the depleted tubes.

It is believed that the invention has been described in sufficient detail to enable the skilled artisan to understand and practice the same. It is intended that the language of the claims pointing out the invention be construed broadly commensurate with the progress in the arts and sciences contributed by the invention.

What it is desired to secure by Letters Patent of the United States is:

1. A device for extruding the contents of at least a pair of collapsible tubes in predetermined proportions simultaneously by rolling the flattened ends of the tubes comprising, a key member for holding the ends of the tubes in side by side arrangement, said member comprising an elongate metal loop formed of a single length of metal rod, said loop having straight, parallel legs connected at opposite ends thereof with the extremities of the rod juxtaposed to form one of said parallel legs, and means engaging over said extremities on opposite sides of the juncture thereof engaging said tubes to assist said holding and to prevent separation of the extremities thereby maintaining said key member in an aligned relation with respect to said tubes during rolling of said flattened ends by the key member whereby said predetermined proportions of material are extruded from each of said tubes.

2. A device for extruding the contents of at least a pair of collapsible tubes in predetermined proportions simultaneously by rolling the flattened ends of the tubes comprising, a key member for holding the ends of the tubes in side by side arrangement, said member comprising an elongate metal loop formed of a single length of metal rod, said loop having straight, parallel legs connected at opposite ends thereof with the extremities of the rod juxtaposed to form one of said parallel legs, and means engaging over said extremities on opposite sides of the juncture thereof to engage said tube to assist said holding and to prevent separation of the extremities thereby maintaining said key member in aligned relation with respect to said tubes during rolling of said flattened ends by the key member, comprising a sleeve member having said extremities on the interior thereof whereby said predetermined proportions of material are extruded from said tubes.

3. A device for extruding the contents of at least a pair of collapsible tubes in predetermined proportions simultaneously by rolling the flattened ends of the tubes comprising, a key member for holding the ends of the tubes in side by side arrangement, said member comprising an elongate metal loop formed of a single length of metal rod, said loop having straight, parallel legs connected at opposite ends thereof with the extremities of the rod juxtaposed to form one of said parallel legs, and means engaging over said extremities on opposite sides of the juncture thereof to prevent separation of the extremities thereby maintaining said key member in an aligned relation with respect to said tubes during rolling of said flattened ends by the key member, comprising a channel-shaped clip member attached to said one leg over the juncture of said extremities with the clip member opening away from the said one leg, said ends of the tubes being engaged in said clip member whereby said predetermined proportions of material are extruded from said tubes.

4. A device for extruding the contents of at least a pair of collapsible tubes in predetermined proportions simultaneously by rolling the flattened end of the tubes comprising, a key member having an open formation for receiving ends of the tubes therein and holding the tubes in side by side arrangement, and bearing means cooperable with said open formation for rolling the flattened ends, said bearing means having a handle for manual rotation of the key member, said bearing means comprising an elongate metal loop having straight, parallel legs connected at opposite ends thereof, said loop formed of a single length of metal rod with the extremities thereof juxtaposed to form one of said legs, said open formation comprising a metal clip member rigidly attached to said one leg over said extremities adapted to maintain said key member in an aligned relation with respect to said tubes, whereby said predetermined proportions of material are extruded from said tubes.

References Cited in the file of this patent

UNITED STATES PATENTS

| | | |
|---|---|---|
| 885,741 | Emerson | Apr. 28, 1908 |
| 1,507,393 | Matias | Sept. 2, 1924 |
| 1,522,246 | Jefferson | Jan. 6, 1925 |
| 1,575,386 | Randall | Mar. 2, 1926 |
| 2,065,016 | Oldfield | Dec. 22, 1936 |
| 2,133,754 | Oscar | Oct. 18, 1938 |
| 2,166,307 | Libby | July 18, 1939 |
| 2,633,270 | Young | Mar. 31, 1953 |
| 2,754,031 | Ostrov et al. | July 10, 1956 |

FOREIGN PATENTS

| | | |
|---|---|---|
| 141,131 | Australia | Nov. 5, 1948 |
| 179,810 | Great Britain | May 18, 1922 |